United States Patent
Vos

(10) Patent No.: US 10,931,492 B2
(45) Date of Patent: Feb. 23, 2021

(54) TWO-TONE IN-PHASE PI/2 BINARY PHASE-SHIFT KEYING COMMUNICATION

(71) Applicant: Sierra Wireless, Inc., Richmond (CA)

(72) Inventor: Gustav Gerald Vos, Surrey (CA)

(73) Assignee: Sierra Wireless, Inc., Richmond, CA (US)

( * ) Notice: Subject to any disclaimer, the term of this patent is extended or adjusted under 35 U.S.C. 154(b) by 45 days.

(21) Appl. No.: 16/192,092

(22) Filed: Nov. 15, 2018

(65) Prior Publication Data

US 2019/0149381 A1    May 16, 2019

Related U.S. Application Data

(60) Provisional application No. 62/586,432, filed on Nov. 15, 2017.

(51) Int. Cl.
*H04L 27/26* (2006.01)
*H04L 5/00* (2006.01)
*H04L 27/34* (2006.01)

(52) U.S. Cl.
CPC ........ *H04L 27/2636* (2013.01); *H04L 5/0053* (2013.01); *H04L 27/2628* (2013.01); *H04L 27/3444* (2013.01); *H04L 5/0007* (2013.01); *H04L 27/2614* (2013.01)

(58) Field of Classification Search
CPC .............. H04L 5/0048; H04L 27/0008; H04L 27/2613; H04L 27/2636; H04L 5/0007
See application file for complete search history.

(56) References Cited

U.S. PATENT DOCUMENTS

| 2009/0232253 | A1 | 9/2009 | Letunov et al. |
| 2017/0295047 | A1 | 10/2017 | Zeng et al. |
| 2018/0054332 | A1* | 2/2018 | Kuchi ............... H04L 25/03834 |
| 2018/0279299 | A1* | 9/2018 | Park .................. H04W 72/0453 |
| 2019/0140779 | A1* | 5/2019 | Jia ......................... H04L 5/0007 |

FOREIGN PATENT DOCUMENTS

| WO | 2005006693 A1 | 1/2005 |
| WO | 2019095057 A1 | 5/2019 |

OTHER PUBLICATIONS

Sertac Sayin, "PAPR Reduction in OFDM Communications with Generalized Discrete Fourier Transform", May 2010.

(Continued)

*Primary Examiner* — Jung H Park
(74) *Attorney, Agent, or Firm* — McDonnell Boehnen Hulbert & Berghoff LLP

(57) ABSTRACT

A method and apparatus for communication, e.g. in an LTE system, that uses two tones with an in-phase pi/2 BPSK modulation with single carrier frequency-division multiple access (SC-FDMA). Pairs of input bits are converted to symbols using pi/2 BPSK, with each one of the pair of bits converted using a same symbol constellation, and successive pairs of bits converted using alternatingly different symbol constellations. The two constellations may be identical after a pi/2 radian rotation. Pairs of symbols corresponding to pairwise converted bits may be treated as the symbols for a pair of tones of a subsequent SC-FDMA, OFDMA, or similar processing operation.

23 Claims, 12 Drawing Sheets

(56) References Cited

OTHER PUBLICATIONS

Sections 14.1 and 14.3 of "LTE—The UMTS Long Term Evolution, from Theory to Practice," 2nd Edition, S. Sesia, 2011, Wiley Press.
International Search Report dated Jan. 30, 2019 for corresponding PCT application—WO 2019/095057.
Written Opinion dated Jan. 30, 2019 for corresponding PCT application—WO 2019/095057.

* cited by examiner

TWO-TONE IN-PHASE PI/2 BINARY PHASE-SHIFT KEYING COMMUNICATION

CROSS-REFERENCE TO RELATED APPLICATION

The present application claims priority from U.S. Provisional Patent Application No. 62/586,432 filed on Nov. 15, 2017, and which is incorporated herein by reference in its entirety.

FIELD OF THE INVENTION

The present invention pertains to the field of telecommunication and in particular to a method and apparatus for two-tone in-phase pi/2 binary phase-shift keying (BPSK) communication.

BACKGROUND OF THE INVENTION

For enhanced Machine-Type Communication (eMTC) technologies under consideration by the 3$^{rd}$ Generation Partnership Project (3GPP), current indications are that single-tone sub-PRB modulation schemes will not be accepted. This is in contrast to narrowband internet of things (NB-IOT) specifications. Two-tone sub-PRB modulation schemes have been accepted for eMTC, for example with three tones allocated and two of the three tones used. However, two-tone modulation using Quadrature Phase-Shift Keying (QPSK) has a significantly higher Peak-to-Average Power Ratio (PAPR). The 99.9% PAPR is about 3.5 dB.

Narrow Band Internet of Things (NB-IOT) specifications include the use of single tone pi/2 Binary Phase-Shift Keying (BPSK) that provides about 0.5 dB PAPR.

To support technologies such as eMTC, there is a need for a method and apparatus for communication, for example in radio communication systems such as those standardized by 3GPP, using a two-tone modulation scheme, preferably with low PAPR, and that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a method and apparatus for communication using two-tone in-phase pi/2 (also referred to as π/2) binary phase-shift keying (BPSK). In some embodiments, the method and apparatus for communication uses two-tone in-phase pi/2 BPSK sub-physical resource block (sub-PRB) modulation.

In accordance with an aspect of the invention, there is a provided method and apparatus that uses two tones with an in-phase pi/2 BPSK modulation with single carrier frequency-division multiple access (SC-FDMA).

According to an embodiment of the present invention, there is provided a method for communicating data from a transmitting device. The method includes receiving binary input data. The method further includes converting pairs of bits of the binary input data into corresponding pairs of modulation symbols using in-phase pi/2 binary phase-shift keying (BPSK). For example, both bits of each pair of bits are converted to modulation symbols using a same symbol constellation, and wherein successive pairs of bits are alternatingly converted to modulation symbols using alternatingly different BPSK symbol constellations, which differ from each other by pi/2 radians of rotation. The method further includes presenting pairs of modulation symbols for further processing prior to transmission. Successive pairs of modulation symbols are generated from corresponding successive pairs of bits, the further processing is performed concurrently on each pair of modulation symbols. The further processing comprises processing the modulation symbols for transmission using a multiple access transmission scheme, such as SC-FDMA.

According to an embodiment of the present invention, there is provided an apparatus for communicating data, the apparatus comprising electronic circuitry. The circuitry is configured to receive binary input data. The circuitry is further configured to convert pairs of bits of the binary input data into corresponding pairs of modulation symbols using in-phase pi/2 binary phase-shift keying (BPSK). The circuitry is further configured to provide pairs of modulation symbols for further processing prior to transmission. Successive pairs of modulation symbols are generated from corresponding successive pairs of bits. The further processing is performed concurrently on each pair of modulation symbols. The further processing comprises processing the modulation symbols for transmission using a multiple access transmission scheme, such as SC-FDMA.

The further processing may include SC-FDMA processing of symbols for transmission. The further processing may include sub-Physical Resource Block (sub-PRB) modulation. Sub-PRB modulation may include handling the pairs of modulation symbols as modulation symbols mapped to a pair of respective tones to be transmitted using a corresponding pair of subcarriers of a Physical Resource Block comprising the pair of subcarriers along with additional subcarriers. The method may further include performing (and the associated apparatus may be configured to perform) a Discrete Fourier Transform (DFT) operation on each successive pair of modulation symbols. The DFT operation may follow or be integrated with the converting of pairs of bits into corresponding pairs of modulation symbols.

BRIEF DESCRIPTION OF THE FIGURES

These and other features of the invention will become more apparent in the following detailed description in which reference is made to the appended drawings.

DETAILED DESCRIPTION OF THE INVENTION

Embodiments of the present invention provide a method and apparatus for communication using two-tone in-phase pi/2 binary phase-shift keying (BPSK) sub-Physical Resource Block (sub-PRB) modulation. Accordingly, pi/2 BPSK is used for the signal modulation scheme. Two bits of information to be communicated are subjected to pi/2 BPSK modulation at a time. This modulation generates two corresponding complex-valued symbols. For in-phase operation, each of the two symbols is selected from the same candidate set. That is, in a given time interval, a first bit is mapped to a first BPSK symbol based on a given set, and a second bit is mapped to a second BPSK symbol based on the same given set. In a next time interval, two more bits of information to be communicated are provided and mapped in the same manner, except that the mapping from bits to symbols is based on a different set of symbols, for example having all symbols rotated pi/2 radians from the symbols in the previous set. The different set may be such that each of its symbols matches a different corresponding symbol from the previous set when rotated by ±pi/2 radians. Two sets may alternatingly be used: Set A={+1 −1} and Set B={+i −i}.

LTE systems define a PRB having twelve "tones" in contiguous 15 kHz frequency bands, thus providing a 180 kHz PRB. Sub-PRB modulation, in the context of LTE systems and similar systems that use PRBs for transmission, refers to the use of one, two, or more, but fewer than all, of the multiple tones of the PRB. In embodiments of the present invention, sub-PRB modulation may refer to the use of two (e.g. out of a possible 12) tones of a PRB for transmission, such as uplink transmission to a eNB. In embodiments, other UEs may be assigned and concurrently utilize the other ten tones for their own transmissions. If three (e.g. contiguous) tones are allocated to a UE, the UE may use two of the three allocated tones in a given PRB for uplink transmission.

It is noted that the input bits of information to be communicated can be part of an arbitrary stream or plurality of bits, and may have been subjected to any number of previous digital operations such as, but not limited to, encoding, encryption and scrambling.

The apparatus may be a mobile device such as a UE or a corresponding base station, radio access node, or radio communication component thereof. The method may be performed in such an apparatus, for example by the suitable operation of digital, analog, or both digital and analog electronic components thereof.

Embodiments of the present invention may be implemented in communication networks standardized or discussed for standardization by the 3GPP. The present invention may require changes to the relevant 3GPP standards currently established and/or under development in the field of telecommunication, such as the eMTC standards.

Figure 1:
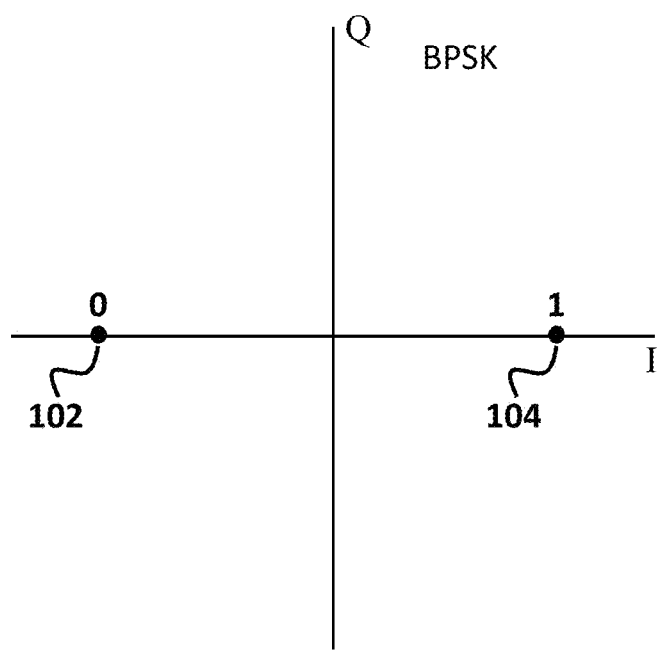
FIG. 1 illustrates a BPSK signal constellation.

FIG. 1 illustrates an example BPSK signal constellation diagram, according to the prior art. The BPSK signal constellation is represented in the in-phase/quadrature (I-Q) plane, with the in-phase axis being vertical and the quadrature axis being horizontal. As will be readily understood, the I-Q plane can be equated, for purposes of analysis and discussion, with the complex plane, such that the in-phase axis corresponds to the real axis and the quadrature axis corresponds to the imaginary axis.

The two constellation points 102, 104 of the BPSK signal constellation are used to represent digital information. The first point 102 can be used to represent a binary '0' and the second point 104 can be used to represent a binary '1', for example. Each constellation point can be interpreted as the endpoint of a vector (beginning at the Origin), which makes a particular angle with the positive "I" (or real) axis. As will be readily understood, this vector can be represented, as a complex number in polar form, as a value $re^{i\theta}$, where r is the vector magnitude and $\theta$ is the angle the vector makes with the positive real axis. It is noted that $re^{i\theta}=r(\cos\theta+i\sin\theta)$. For purposes of discussion, r can be normalized to 1. It follows that point 102 (−1+0i) corresponds to $\theta=\pi$ and point 104 (1+0i) corresponds to $\theta=0$.

In a canonical BPSK modulation, a carrier signal is directly phase shifted by an amount equal to this angle (thus, to indicate a binary '0' the carrier would be phase shifted by $\pi$ radians, while to indicate a binary '1' the carrier signal would not be phase shifted). However, in other, more complex modulations schemes, the constellation points, treated as complex numbers (or as pairs of values) are further processed before being used in the modulation of one or more carrier signals.

Although the invention is discussed herein using signal constellation diagrams and complex valued numbers, it will be readily understood that, in practice, modulation comprises receiving binary input data and transmitting corresponding signals, such as radio signals at a given frequency. Although the properties of the correspondence may be described using mathematical language for purposes of clarity, the present invention comprises the practical modulation and transmission of signals.

Figure 2:
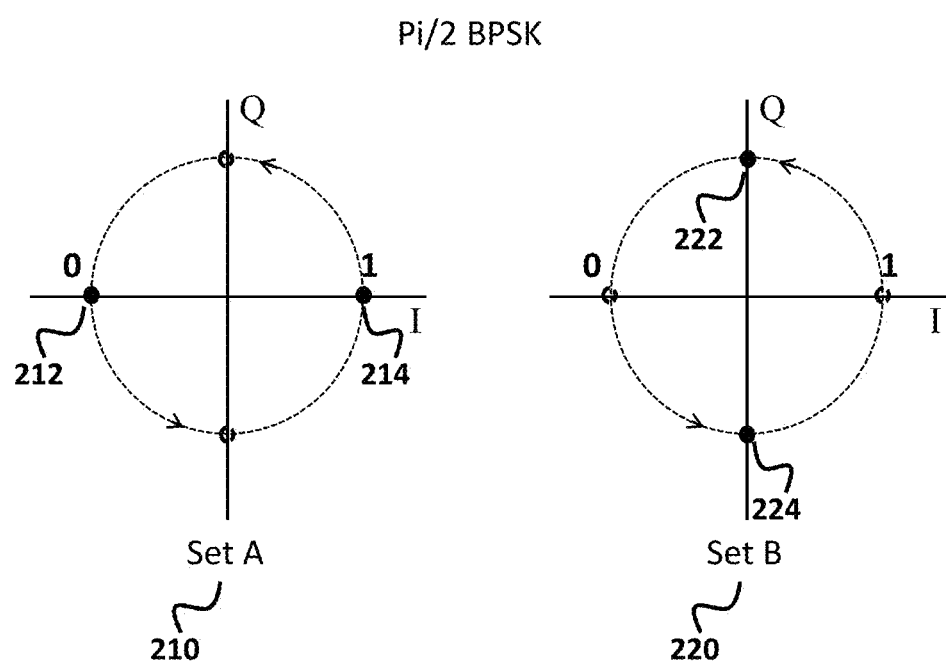
FIG. 2 illustrates two sets of constellations for pi/2 BPSK (Set A and Set B), according to an embodiment of the present invention.

FIG. 2 illustrates two constellations for pi/2 BPSK, according to embodiments of the present invention. Each constellation is also referred to as a set, to denote that it is a set of constellation points (or modulation symbols). The two sets are denoted Set A and Set B. As illustrated, Set A 210 includes the two points {+1 −1} (212, 214) and Set B 230 includes the two points {+i −i} (222, 224). Points in Set A and Set B are represented in the complex plane, with the two axes of the complex plane corresponding to in-phase (I) and quadrature (Q) axes, as would be readily understood by a person skilled in the art.

More generally, given a complex number c, Set A can be equal to $\{c, ce^{i\pi}\}$, a set containing two opposing points (summing to zero) in the complex plane. Set B can then be equal to $\{ce^{i\pi/2}, ce^{-i\pi/2}\}$, another set containing two opposing points in the complex plane. Other equivalent representations can be formulated. Number c may be 1, i, $(1+i)/\sqrt{2}$ or $re^{i\theta}$ (for arbitrary real values of r and $\theta$), for example. In view of the above, where r and θ are arbitrary real values, Set A can be equal to $\{re^{i\theta}, re^{i(\theta+\pi)}\}$ and Set B can be equal to $\{re^{i(\theta+\pi/2)}, re^{i(\theta-\pi/2)}\}$.

BPSK includes the mapping of each bit of information to a constellation point using a corresponding signal constellation consisting of two diametrically opposed constellation points. In plain BPSK, the signal constellation is constant. In pi/2 BPSK, two different signal constellations are alternatingly applied. The two signal constellations can be such that one constellation can be obtained by rotating the other by pi/2 radians.

According to embodiments of the present invention, every symbol period (corresponding to a block of one or more symbols being provided to and handled by a SCFDMA or similar scheme), the set of constellation points used for mapping bits to symbols switches from Set A to B. That is, Sets A and B are alternatingly used for signal modulation, with the alternation occurring once every symbol. For single-tone modulation, this leads to the following representation:

Tone 1: {SetA} {SetB} {SetA} {SetB} {SetA} {SetB}.

That is, the first symbol is selected from Set A, the second symbol is selected from Set B, the third symbol is selected from Set A, etc. (Alternatively, the first symbol can be selected from Set B, the second from Set A, etc.) Selection of a symbol from each set can be performed according to whether a binary '1' or a binary '0' is being represented, as would be readily understood by a worker skilled in the art. For example, a binary '1' may be consistently mapped to (i.e. represented by) one member of the set presented for selection, whereas a binary '0' is consistently mapped to the other member of this set.'

Thus, for example, under the constellations illustrated in FIG. 2, and following the convention that binary '0' is mapped to constellation points having negative a real or imaginary part, the binary sequence '00111001' would be mapped to the sequence of constellation points '−1, −i, +1, +i, +1, −i, −1, +i'.

Figure 3:
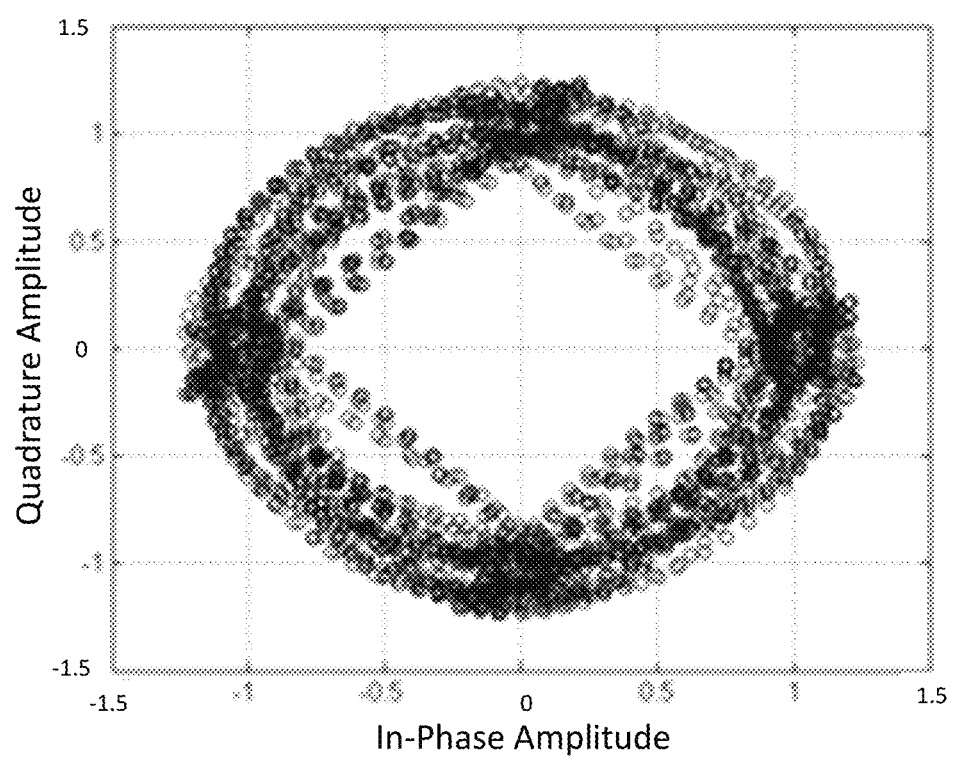
FIG. 3 illustrates an example eye diagram for a single tone, resulting from two sets of constellations involving pi/2 BPSK modulation according to FIG. 2.

Using the above scheme avoids the occurrence of two immediately sequential symbols which are opposite from each other (i.e. π radians of rotation about the Origin away from each other) in the complex or I-Q plane representation. Rather, each two immediately sequential symbols are ±pi/2 radians of rotation about the Origin away from each other. As such, transitions through the middle of the complex (or I-Q) plane, which are known to increase PAPR, are avoided. The resulting eye diagram for a single tone may resemble the one illustrated in FIG. 3. It is noted that there are no transitions through the Origin in FIG. 3, which corresponds to the above-described property.

When there are two tones, there are two possible ways to encode pi/2 BPSK, namely in-phase and out-of-phase encoding. Tones may refer to different frequencies used in the communication scheme. For example, in an LTE PRB, the tones may each be one of twelve frequencies spaced apart by 15 kHz intervals. In a two-tone BPSK modulation, a sequence of information bits is separated into two sub-sequences. For example, bits in odd-numbered positions of the sequence may be mapped to a first sub-sequence and bits in even-numbered positions may be mapped to a second subsequence. However, it is noted that other separation rules known or knowable by both transmitter and receiver can be used. The bits in each subsequence are used concurrently to modulate different tones. Each concurrent modulation can comprise a pi/2 BPSK modulation as discussed above.

For out-of-phase encoding, different sets are used for each tone. That, is, when Tone 1 is using Set A, Tone 2 uses Set B. When Tone 1 uses Set B, Tone 2 uses Set A. Two bits are mapped at a time using different sets, and the outputs of the mappings are used in modulating the two different tones. As before, the sets used for each tone alternate with each symbol. This scenario can be represented as follows:

Tone 1: {SetA} {SetB} {SetA} {SetB} {SetA} {SetB};
Tone 2: {SetB} {SetA} {SetB} {SetA} {SetB} {SetA}.

For in-phase encoding, the same set is used for both tones. That is, when Tone 1 is using Set A, Tone 2 also uses Set A. When Tone 1 uses Set B, Tone 2 also uses Set B. Two bits are mapped at a time using the same set of the same pi/2 BPSK modulation scheme, and the outputs of the mappings are used in modulating the two different tones. As before, the sets used for each tone alternate with each symbol. This scenario can be represented as follows:

Tone 1: {Set A} {Set B} {Set A} {Set B} {Set A} {Set B};
Tone 2: {SetA} {SetB} {SetA} {SetB} {SetA} {SetB}.

A tone "using" a given set refers to symbols from the set being used to convey data. That is, symbols for the given tone are selected from the given set, based on an input bit (or bits) corresponding to the symbol.

Thus, for example, under the constellations illustrated in FIG. 2, and again following the convention that binary '0' is mapped to constellation points having negative a real or imaginary part, and further following the implementation that the first, third, etc. bits (i.e. the bits in odd-numbered positions) are mapped to Tone 1 and the second, fourth, etc. bits (i.e. the bits in even-numbered positions) are mapped to Tone 2, the binary sequence '00111001' would be mapped as follows. The sequence of constellation points for Tone 1 (obtained by mapping a first subsequence '0110' comprising the bits in odd-numbered positions) would be '−1, +i, +1, −i'. The sequence of constellation points for Tone 2 (obtained by mapping a second subsequence '0101' comprising the bits in even-numbered positions) would be '−1, +i, −1, +i'.

According to embodiments of the present invention, for two-tone transmission and in-phase encoding, the sequence to transmit is given as follows:

1. Input of information to be transmitted at a time is a 2 bit vector;
2. The input vector is modulated using in-phase pi/2 BPSK as described above;
3. The output of the modulation is subjected to a fast Fourier transform (FFT) operation (e.g. as a part of SC-FDMA spreading);
4. Sub-carrier Mapping is performed on the output of the previous step;
5. An inverse FFT (iFFT) operation is performed on the output of step 4 (or step 3 if step 4 is omitted);
6. The output of the previous step is subjected to transmission (Tx) filtering.

For example, two bits of information are provided at a time in step 1. In step 2, one of the two bits is used to select a symbol from the current set (either Set A or Set B) corresponding to Tone 1, while the other bit is used to select a symbol from the current set (the same set, in the case of in-phase encoding) corresponding to Tone 2. The set is switched (e.g. from Set A to Set B or vice-versa) after processing each two-bit vector input to provide two corresponding symbols. Step 2 can be performed for example by a baseband modulator which concurrently maps two binary inputs to two complex symbols (or vectors, or equivalent electronic representations of the symbols), as would be readily understood by a worker skilled in the art. In steps 3 to 6, FFT, Sub-carrier Mapping, iFFT and transmission filtering operations are then performed as would be readily understood by a worker skilled in the art, for example according to typical SC-FDMA operation, etc. SC-FDMA operations of this type are described for example in Sections 14.1 and 14.3 of "LTE—The UMTS Long Term Evolution, from Theory to Practice," $2^{nd}$ Edition, S. Sesia, 2011, Wiley Press. Discrete Fourier transforms (DFTs) in general may be used rather than fast Fourier transforms (FFTs) in particular. An FFT operation is performed on the two complex symbols, handled as a vector. Then sub-carrier mapping may be performed on the vector output of the FFT operation. In some simplified cases, sub-carrier mapping may possibly be omitted. Then an iFFT operation is performed on the vector output of the sub-carrier mapping, etc. Steps 1 to 6 may be performed using dedicated electronic circuitry. Such circuitry may include digital components, analog components, or a combination thereof, operable at suitable speeds and driven by a clock signal. At least steps 3 to 6, taken individually, and suitable circuitry for performing same, would be readily understood by a worker skilled in the art.

It is considered herein that the in-phase pi/2 BPSK modulation reduces PAPR because the FFT operation used in SC-FDMA spreading (i.e. according to step 3 above) reduces the two tones to one. Tables 1 and 2 show the output of an FFT operation applied to the output of the two-tone in-phase pi/2 BPSK modulation of step 2. The two tables are divided based on whether Set A or Set B (taken as in FIG. 2) is being applied.

TABLE 1

FFT input/output correspondence for BPSK Symbols from Set A

| BPSK modulation Symbol for Tone 1 | BPSK modulation symbol for Tone 2 | Output of FFT operation applied to pair of symbols |
|---|---|---|
| +1 | +1 | +2 0 |
| +1 | −1 | 0 +2 |
| −1 | +1 | 0 −2 |
| −1 | −1 | −2 0 |

TABLE 2

FFT input/output correspondence for BPSK Symbols from Set B

| BPSK modulation Symbol for Tone 1 | BPSK modulation symbol for Tone 2 | Output of FFT operation applied to pair of symbols |
|---|---|---|
| +i | +i | +2i 0 |
| +i | −i | 0 +2i |
| −i | +i | 0 −2i |
| −i | −i | −2i 0 |

It is noted that this does not work in the same manner for the out-of-phase pi/2 BPSK scenario, because the FFT does not reduce to one tone (e.g. FFT of [+1+i] → (1+i) (1−i) → Two tones).

In some embodiments, the sets of modulation symbols are such that the points in the sets are either both purely real or both purely imaginary. That is, Set A={+1, −1} and Set B={+i, −i} as described above are used, rather than other sets of the general form, e.g. Set A={$re^{i\theta}$, $re^{i(\theta+\pi)}$}, Set B={$re^{i(\theta+\pi/2)}$, $re^{i(\theta-\pi/2)}$}.

It is noted that each row in Tables 1 and 2 corresponds to a different pair of input bits. For example, in row 1, the given (Tone 1, Tone 2) pair is generated by corresponding input bit pair (1,1). According to embodiments of the present invention, two-tone in-phase pi/2 BPSK can be combined with FFT, without necessarily performing the BPSK and FFT operations separately. Rather, for example, circuitry (e.g. comprising a limited set of logic gates and a circuit which alternatingly applies mappings according to Set A and Set B) can be provided which directly generates the appropriate FFT output vector according to a corresponding pair of input bits. For example, input bit pairs in the first column of Table 3 can be alternatingly mapped to corresponding FFT output vectors in the second and third columns of Table 3, respectively. Such circuitry may be further simplified by observing that the third column in Table 2 is equal to the third column in Table 1 with entries multiplied by i.

TABLE 3

Mapping Bit Pairs to FFT Outputs

| Input Bit Pair | FFT Output (Alternate 1) | FFT Output (Alternate 2) |
|---|---|---|
| (0, 0) | (−2, 0) | (−2i, 0) |
| (0, 1) | (0, −2) | (0, −2i) |
| (1, 0) | (0, +2) | (0, +2i) |
| (1, 1) | (+2, 0) | (+2i, 0) |

Figure 4:
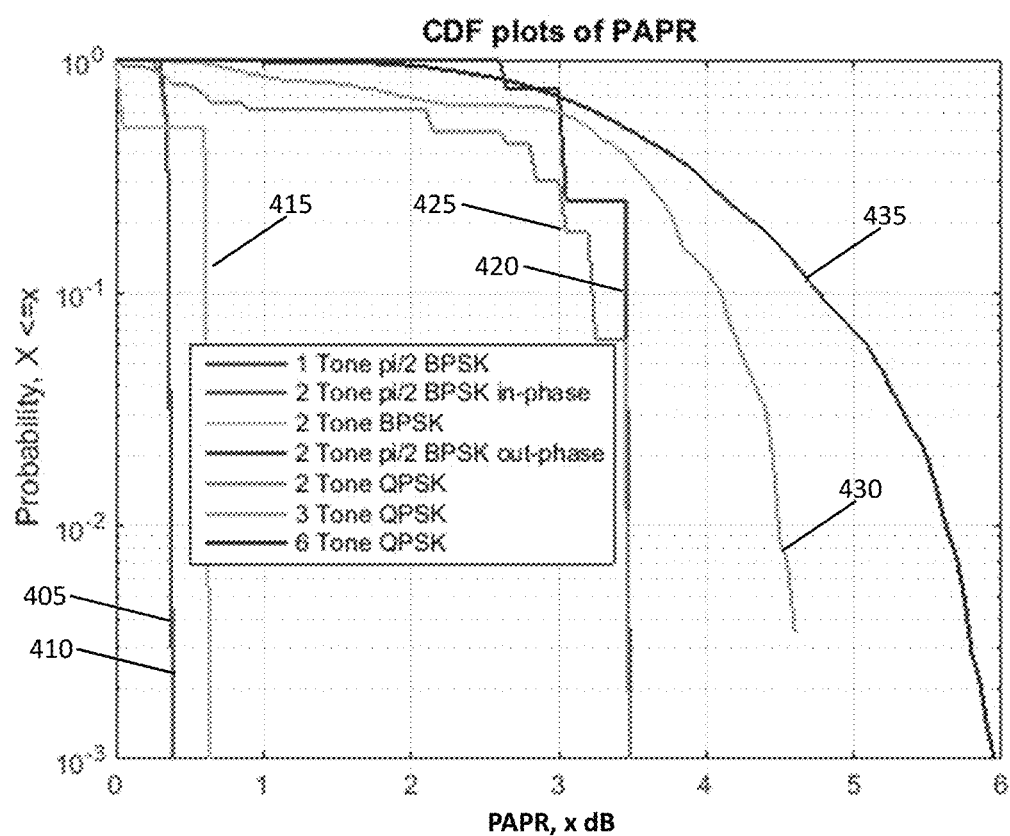
FIG. 4 illustrates PAPR performance for several modulations and tones, including embodiments of the present invention.

FIG. 4 illustrates PAPR comparisons between several modulations and tones. As illustrated in the figure, two-tone in-phase pi/2 BPSK 410 has substantially better PAPR (~0.5 dB) than the two-tone out-of-phase pi/2 BPSK 420 (3.5 dB). It is noted that, while not easily visible, the single-tone pi/2 BPSK PAPR plot line 405 in FIG. 4 is closely aligned with the two-tone in-phase pi/2 BPSK PAPR plot line 410. As such, these two schemes exhibit similar PAPR characteristics. FIG. 4 further illustrates PAPR for two-tone standard BPSK 415, two-tone QPSK 425, three-tone QPSK 430, and six-tone QPSK 435.

Figure 5:
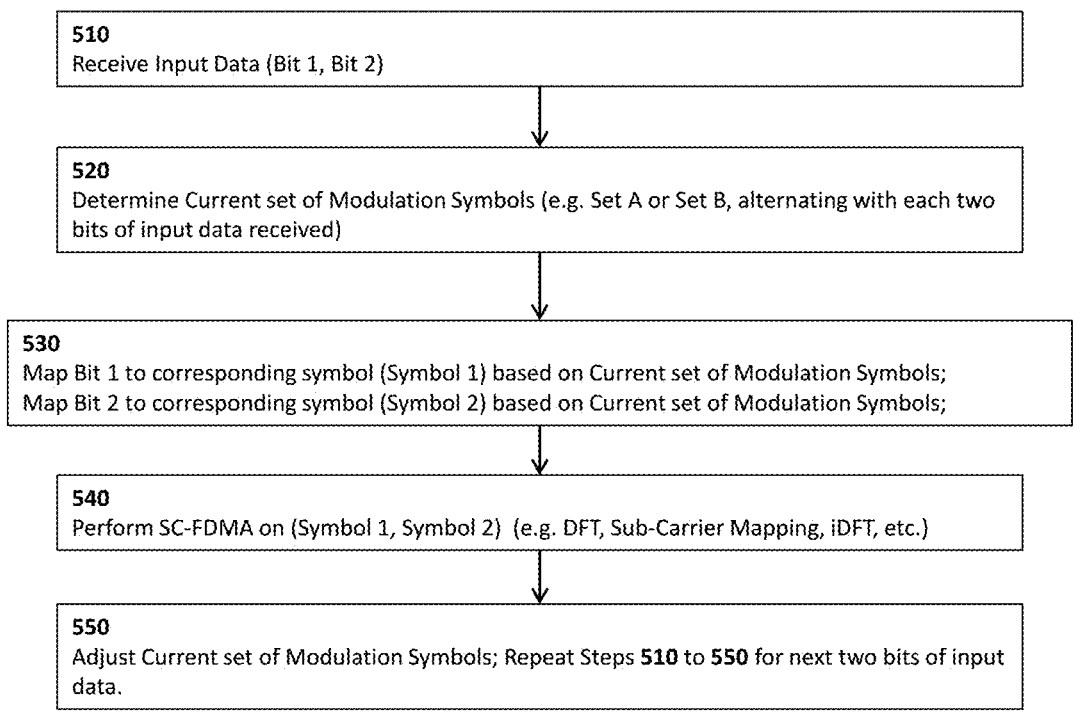
FIG. 5 illustrates a method provided according to an embodiment of the present invention.

FIG. 5 illustrates a method provided in accordance with an embodiment of the present invention. In step 510 two bits of input data are received. The two bits are possibly but not necessarily sequential in a sequence or stream of binary input data. In step 520 the current set of modulation symbols for use in mapping each of the two bits of input data to complex-valued symbols is determined. As described above, the current set alternates after each two bits of input data received and processed. In step 530 the first bit of input data is mapped to a corresponding first symbol based on the current set of modulation symbols, and the second bit of input data is mapped to a corresponding second symbol based on the same current set of modulation symbols (in-phase modulation). In step 540 the first and second symbols are operated on in accordance with SC-FDMA operations, including performing a DFT operation on the first and second symbols handled as a vector, subsequently performing iDFT and filtering operations, etc. In step 550 the current set of modulation symbols is adjusted for the next round, and steps 510 to 550 are repeated for the next two bits of input data.

It is further noted that, in step 520, a first one of the two bits can be mapped to a first modulation symbol using a first pi/2 BPSK modulation circuit, and a second one of the two bits can be mapped to a second modulation symbol using a second, separate pi/2 BPSK modulation circuit operating in parallel with the first pi/2 BPSK modulation circuit. The first and second modulation circuits are synchronized so that the same set of modulation symbols is applied at the same time, and the set of modulation symbols is alternated after each bit is mapped. Alternatively, a single pi/2 BPSK modulation circuit can be used to map both of the two bits, with the set of modulation symbols being alternated after each pair of bits is mapped.

Figure 6:
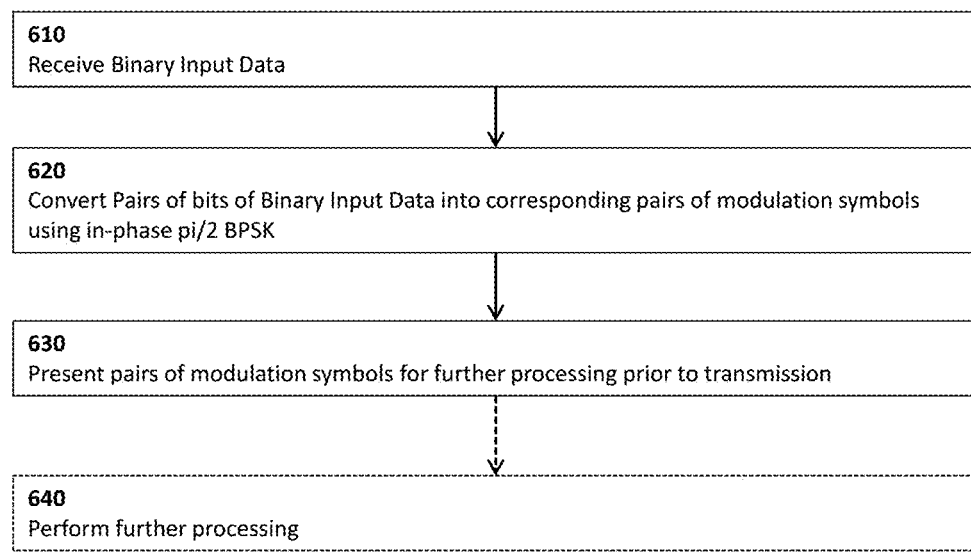
FIG. 6 illustrates a method provided according to another embodiment of the present invention.

FIG. 6 illustrates a method for communicating data from a transmitting device, according to another, related embodiment of the invention. The method includes receiving 610 binary input data. The method further includes converting 620 pairs of bits of the binary input data into corresponding pairs of modulation symbols using in-phase pi/2 binary phase-shift keying (BPSK). In more detail, both bits of each pair of bits are converted to modulation symbols using a same symbol constellation, and successive pairs of bits are alternatingly converted to modulation symbols using alternatingly different symbol constellations. The different symbol constellations may comprise a first symbol constellation consisting of points $\{re^{j\theta}, re^{j(\theta+\pi)}\}$ and a second symbol constellation consisting of points $\{re^{j(\theta+\pi/2)}, re^{j(\theta-\pi/2)}\}$, wherein r is a predetermined magnitude value and $\theta$ is a predetermined phase offset value.

The method further includes presenting 630 pairs of modulation symbols for further processing prior to transmission, wherein successive pairs of modulation symbols are generated from corresponding successive pairs of bits. The method may include performing 640 the further processing. The further processing may be performed concurrently on each pair of modulation symbols. The further processing may include processing the modulation symbols for transmission using a multiple access transmission scheme. The multiple access scheme may be characterized in that different subsets of a plurality of subcarriers are assigned to different transmitters. In embodiments, the scheme may be SC-FDMA. In embodiments, the scheme may be characterized as one or more of: a frequency division multiple access scheme, SC-FDMA, linearly precoded OFDMA, a spread-spectrum transmission scheme, or another transmission scheme with a spreading component (but not necessarily with spectral broadening). More particularly, the further processing may include SC-FDMA processing of symbols for transmission. The further processing may include sub-Physical Resource Block (sub-PRB) modulation, which includes handling the pairs of modulation symbols as modulation symbols mapped to a pair of respective tones to be transmitted using a corresponding pair of subcarriers of a Physical Resource Block comprising the pair of subcarriers along with additional subcarriers. The further processing may include, for example as part of the multiple access transmission scheme, performing a Discrete Fourier Transform (DFT) operation on each successive pair of modulation symbols, the DFT operation following or integrated with the converting of pairs of bits into corresponding pairs of modulation symbols. The further processing may also include one or more of: mapping of generated pairs of symbols from a DFT operation to a plurality of subcarriers of a Physical Resource Block (PRB); performing an inverse Discrete Fourier Transform (iDFT) on concurrent sets of symbols; transmission filtering of concurrent sets of symbols; and wirelessly transmitting symbols representing the binary input data.

Figure 7:
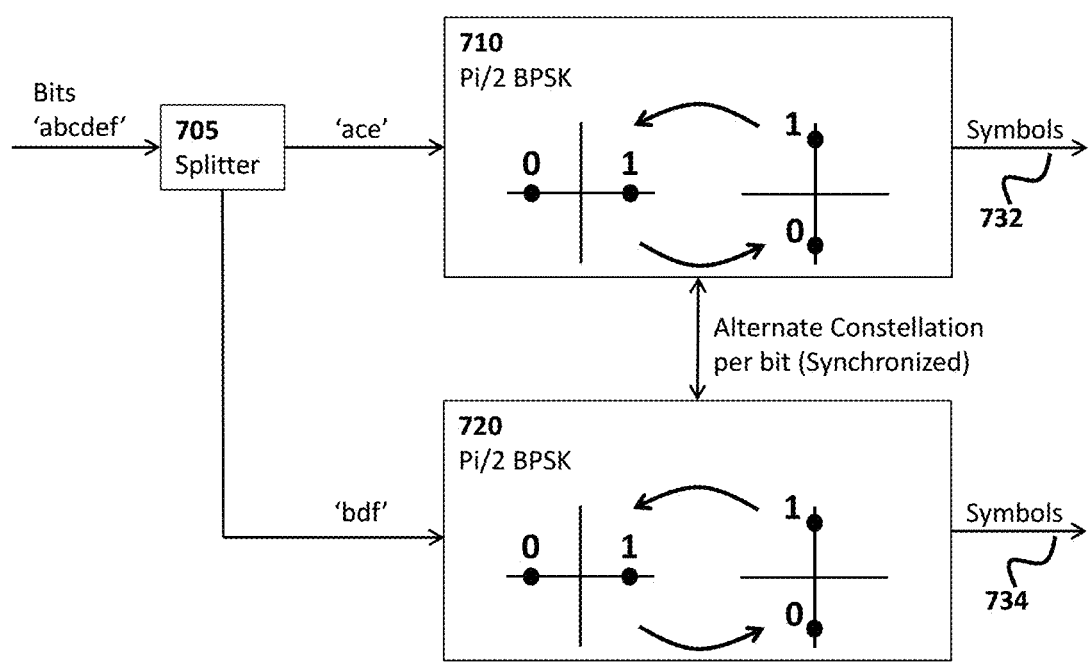
FIG. 7 schematically illustrates circuitry for performing two-tone in-phase pi/2 BPSK modulation, according to an embodiment of the present invention.

FIG. 7 schematically illustrates circuitry for performing two-tone in-phase pi/2 BPSK modulation, according to an embodiment of the present invention. The circuitry includes a splitter 705 which splits incoming binary input data (e.g. 'abcdef . . . ', where each letter is a binary value) into two parts which are provided at two outputs. For example, the splitter can be a 1:2 multiplexer with the selected output alternating for each bit, thereby conveying bits in odd-numbered positions (e.g. 'ace . . . ' of the input data to a first splitter output and bits in even-numbered positions (e.g. 'bdf . . . ') of the input data to a second splitter output. The first splitter output is operatively coupled to the input of a first pi/2 BPSK bit-to-symbol converter 710, and the second splitter output is operatively coupled to the input of a second pi/2 BPSK bit-to-symbol converter 720. The first and second pi/2 BPSK bit-to-symbol converters 710, 720 operate substantially identically to convert input bits to modulation symbols. Each converter 710, 720 converts bits to symbols using alternating sets (e.g. Set A and Set B) of constellation points, with the set of constellation points in use being alternated after conversion of each bit. As already discussed above, the two sets of constellation points are BPSK constellation points which differ from one another by a rotation of pi/2 radians. The two converters 710, 720 then provide the produced symbols for further processing.

The first and second pi/2 BPSK bit-to-symbol converters 710, 720 are synchronized such that, when the first converter 710 is converting a bit to a symbol using a given set (e.g. Set A or Set B) of constellation points, the second converter 710 is also converting another bit to another symbol using the same given set (e.g. Set A or Set B) of constellation points.

Figure 8:
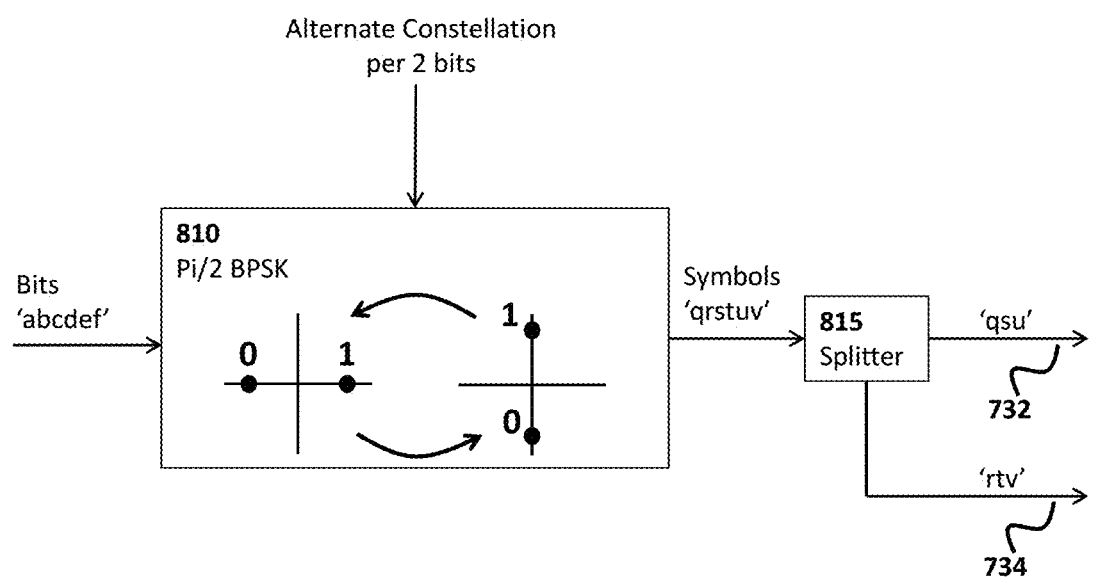
FIG. 8 schematically illustrates circuitry for performing two-tone in-phase pi/2 BPSK modulation, according to another embodiment of the present invention.

FIG. 8 schematically illustrates circuitry for performing two-tone in-phase pi/2 BPSK modulation, according to another embodiment of the present invention. The circuitry of FIG. 8 achieves the same result as that of FIG. 7, except that only one pi/2 BPSK bit-to-symbol converter 810 is required. The converter 810 receives the binary input data and operates in the same manner as the two converters 710, 810. However, in the present embodiment, the set of constellation points in use by the converter 810 is alternated after every two subsequent bit conversions, and is thus kept the same for conversion of those two bits. Output of the converter 810 is passed to a splitter 815, which is similar to the splitter 705 except that it operates on symbols rather than bits. The output of the splitter 815 may be synchronous, so that it outputs two symbols at a time. The two symbols correspond to pairs of bits converted "together" using the same set of constellation points. Symbols output by the splitter 815 are provided for further processing.

Both FIGS. 7 and 8 provide a pair of symbol outputs 732, 734. The first symbol output 732 can be treated as providing symbols associated with a first tone, while the second symbol output 734 can be treated as providing symbols associated with a second tone. These symbol outputs can be further processed by combining the tones (symbol streams) into a single complex baseband symbol stream, or a single low intermediate frequency (IF) signal to be converted to analog form and then upconverted to an RF frequency.

Figure 9:
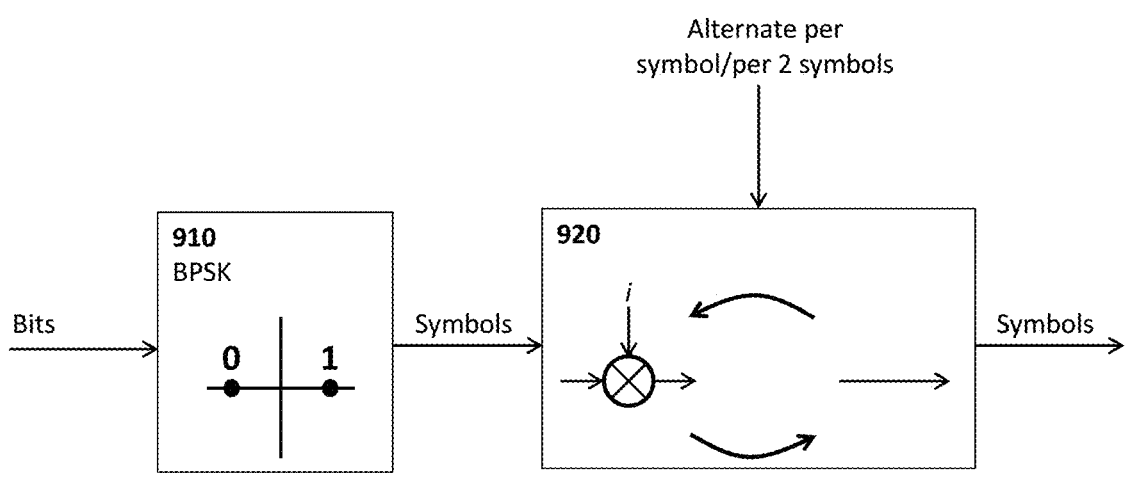
FIG. 9 schematically illustrates an example circuit for performing pi/2 BPSK modulation, according to an embodiment of the present invention.

FIG. 9 schematically illustrates an example circuit for performing pi/2 BPSK modulation, according to an embodiment of the present invention. In this implementation, rather than alternating the set of constellation points directly, each bit is converted to symbols using the same set of BPSK constellation points 910 (e.g. mapping '0' to −1 and mapping '1' to +1). The symbols output by this mapping are then further converted by the alternating symbol converter 920, which alternatingly multiplies the incoming symbol by i (or otherwise rotates the symbol by pi/2 radians) or outputs the symbol unchanged. The alternating can be performed after each symbol (e.g. to realize the converters of FIG. 7), or after each pair of symbols (e.g. to realize the converter of FIG. 8).

Figure 10:
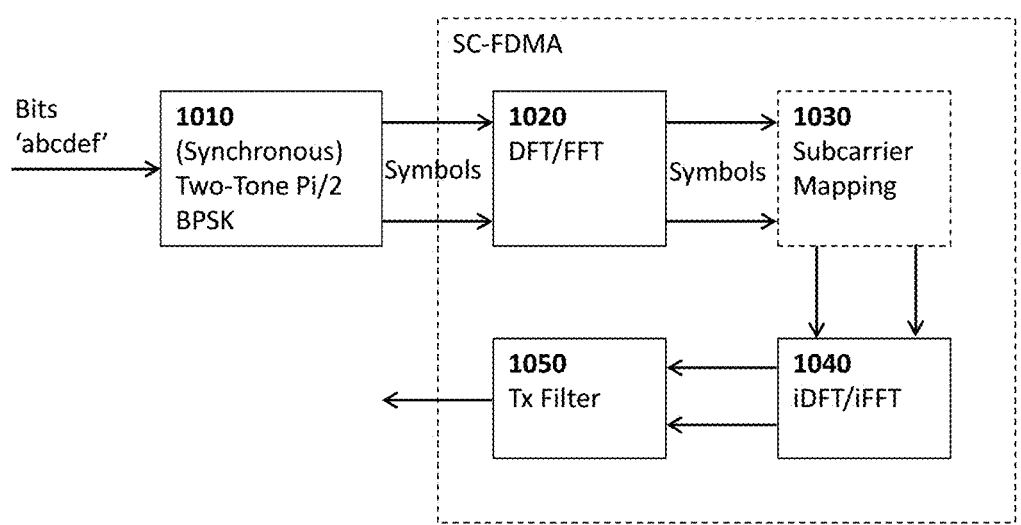
FIG. 10 schematically illustrates circuitry for performing two-tone in-phase pi/2 BPSK modulation, SC-FDMA processing, and further operations, according to an embodiment of the present invention.

FIG. 10 schematically illustrates circuitry for performing two-tone in-phase pi/2 BPSK modulation, SC-FDMA processing (e.g. spreading), and further operations, according to an embodiment of the present invention. Binary input data is received and processed into symbols by a two-tone pi/2 BPSK modulator 1010, which may be the circuit illustrated in FIG. 7 or FIG. 8. Output of the modulator 1010 is provided to a DFT (e.g. FFT) converter 1020, which performs a Fourier transform on pairs of input symbols at a time to produce pairs of output symbols, for example in accordance with Tables 1 and 2. This can be viewed as producing a frequency domain representation of the symbols provided by the modulator 1010. Output of the DFT converter 1020 is provided to a subcarrier mapper 1030, which may be omitted in some embodiments. The subcarrier mapper 1030 associates different outputs of the DFT converter to different selected subcarriers, where there are typically M>2 subcarriers. Output of the subcarrier mapper 1030 is provided to an inverse DFT (e.g. iFFT) converter 1040, which performs an (e.g. M-point) inverse Fourier transform on its provided input. This can be viewed as transforming the subcarrier amplitudes into a complex time domain signal. The inverse Fourier transform may produce a plurality of output symbols based on a corresponding plurality of input symbols. Output of the inverse DFT converter 1040 is provided to a transmission filter 1050. The transmission filter 1050 removes sampling-produced images at frequencies other than the frequency used for transmission. To perform such filtering, the complex baseband may be passed while suppressing higher-frequency images. In some cases, a low IF signal is generated, in which case the baseband and other lower frequency images are suppressed, as well as images higher in frequency than the frequency to be used. Output of the transmission filter 1050 is then provided for wireless transmission. Further operations facilitating wireless transmission, such as symbol serialization, addition of cyclic prefix, pulse shaping (e.g. as part of transmission filtering), digital-to-analog (D/A) conversion, analog filtering following D/A conversion, and RF signal generation and transmission can also be performed, as would be readily understood by a worker skilled in the art, for example in accordance with SC-FDMA transmitter operation. The analog filtering may be used to remove images generated as part of the D/A conversion. The filter can be relatively simple if there is a sufficient amount of oversampling at the D/A input. Oversampling may be performed for example to flatten filter passband and mitigate distortion.

Figure 11:
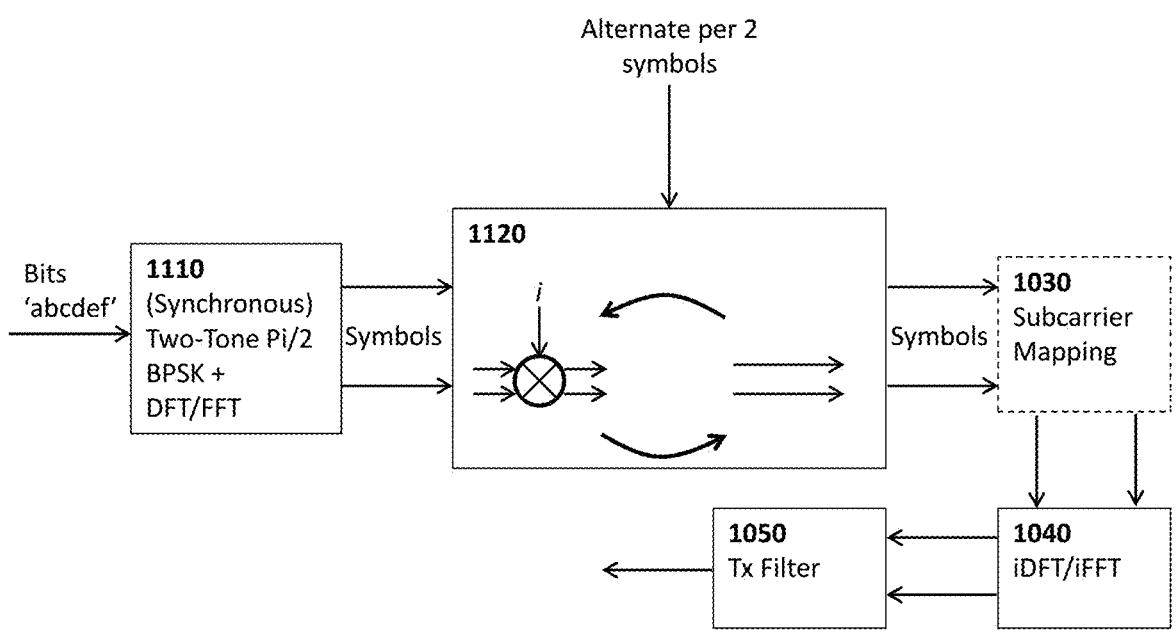
FIG. 11 schematically illustrates circuitry for performing two-tone in-phase pi/2 BPSK modulation integrated with SC-FDMA processing, and further operations, according to another embodiment of the present invention.

FIG. 11 schematically illustrates circuitry for performing two-tone in-phase pi/2 BPSK modulation integrated with SC-FDMA processing (e.g. spreading), and further operations, according to another embodiment of the present invention. The circuitry operates in the same manner as that of FIG. 9, and with the same results. However, the two-tone pi/2 BPSK modulator 911 and DFT converter 920 of FIG. 9 are replaced with a combination two-tone BPSK modulator plus DFT converter 1110, along with an alternating symbol converter 1120. As such, the binary input data can be transformed directly into a frequency domain representation of corresponding modulation symbols, without necessarily having to first generate the time-domain representation of the modulation symbols.

The combination two-tone BPSK modulator plus DFT converter 1110 converts binary input data into symbols and mimics the combined operation of the BPSK modulator 910 and DFT converter 920. However, it is not necessary to perform BPSK modulation and DFT conversion separately. Rather, the DFT output due to pairs of input bits can be derived directly according to the correspondence in the first two columns of Table 3, as discussed above.

The alternating symbol converter 1120 is similar to the alternating symbol converter 920 of FIG. 9, except that it operates on pairs of symbols at a time. The alternating symbol converter 1120 may comprise a pair of synchronized (single-symbol) alternating symbol converters 920, for example. The alternating symbol converter 1120 has the effect of mapping bit pairs in the first column of Table 3 alternatingly to the corresponding symbol pairs in the second and third columns of Table 3. This implements the pi/2 alternating part of the modulation. It is noted that, in other embodiments, the function of the alternating symbol converter can be integrated with the combination two-tone pi/2 BPSK modulator plus DFT converter 1110, for example by causing the combination two-tone pi/2 BPSK modulator plus DFT converter 1110 to produce output symbols alternatingly according to the second column and the third column of Table 3.

In some embodiments, rather than characterizing the operation as alternatingly selecting symbols from Set A and Set B, as described above, data transmission according to the present invention can be similarly implemented by rotating a single set of candidate symbols, $\{c, ce^{i\pi}\}$, (alternatively expressed as $\{re^{i\theta}, re^{i(\theta+\pi)}\}$) by ±pi/2 radians each symbol period. (For example, c=1, or equivalently r=1, θ=0.) For example, the set of candidate symbols can be alternatingly rotated by pi/2 and −pi/2 radians.

Embodiments of the present invention can be used for wireless (i.e. radio) communication in an OFDMA communication system, for example operating according to the LTE standard. Embodiments of the present invention can be used for communication in an SC-FDMA system, for example operating according to the LTE standard. Embodiments of the present invention comprise signal modulation using a two-tone Sub-PRB scheme, as described above. Embodiments of the present invention further comprise signal modulation using a pi/2 BPSK scheme, in conjunction with the two-tone scheme. Embodiments of the present invention further comprise this two-tone pi/2 BPSK signal modulation in the in-phase manner as described above.

Embodiments of the present invention provide for a method for transmitting data, for example wirelessly, using a modulation scheme as described above. The method can be implemented on an electronic device having wireless communication capability. The device can include at least a source of data to be transmitted, an antenna, and electronics for generating the modulated signal for transmission by the antenna based on the sourced data. The electronics can be in the form of an application specific integrated circuit, field programmable gate array, signal processor, microcontroller, processor coupled to memory, or the like, or a combination thereof.

Embodiments of the present invention provide for an apparatus for transmitting data, for example wirelessly, using a modulation scheme as described above. The apparatus can be an electronic device such as that described above, or a portion thereof, such as an electronic component having the described functionality.

Embodiments of the present invention provide for a method and apparatus for receiving and processing data transmitted in the manner described above. The method can be implemented on, and the apparatus can be, an electronic device having wireless communication ability, as described above, or a portion of such an electronic device. Signal reception can proceed in the same manner as signal transmission, with received symbols being interpreted based on comparison to sets of candidate symbols, where the sets of candidate symbols change (e.g. between Set A and Set B) each symbol period. Alternatively, received symbols can be interpreted based on a union of the sets of candidate symbols. For example, each received symbol can be processed to determine which candidate symbol (of Set A or Set B) is closest to the received symbol. The corresponding candidate symbol is then mapped to the received data.

Figure 12:
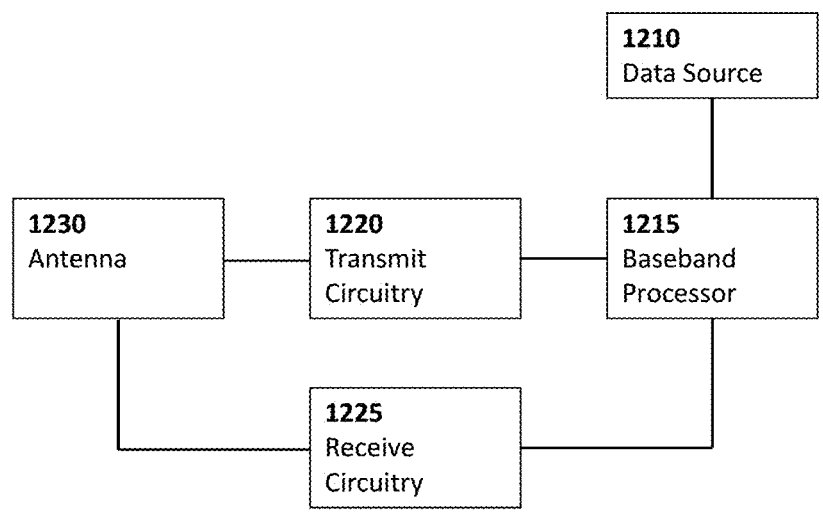
FIG. 12 illustrates an apparatus provided according an embodiment of the present invention.

FIG. 12 illustrates an apparatus provided according an embodiment of to the present invention. The apparatus includes a source of data 1210, a baseband processor 1215, transmit circuitry 1220, receive circuitry 1225, and an antenna 1230. The source of data 1210 a baseband processor 1215, transmit circuitry 1220 and receive circuitry 1225 can be provided using various electronic components, including baseband (e.g. processor, FPGA, ASIC, etc.) and/or RF components, as would be readily understood by a worker skilled in the art.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on a computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

Additionally or alternatively, acts associated with the method described herein can be implemented as operations in appropriate electronic circuitry, such as digital, analog, or both digital and analog circuitry. The circuitry can include baseband electronic components, RF electronic components, logic gates, integrated circuits, etc. It will be readily understood that such circuitry can be configured to perform appropriate actions of the method in response to corresponding inputs. For example, given input binary information to be communicated, the circuitry can modulate two bits of the input information at a time according to a BPSK modulation scheme. Given the set of constellation points used immediately previously to modulate two bits of information, a different set of constellation points for use in currently modulating two more bits of information can be automatically selected by the circuitry, for example by use of feedback circuitry.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A method for communicating data from a transmitting device, the method comprising:
receiving binary input data;
converting pairs of bits of the binary input data into corresponding pairs of modulation symbols using in-phase pi/2 binary phase-shift keying (BPSK), both bits of each pair of bits being converted to modulation symbols using a same symbol constellation; and
presenting pairs of modulation symbols for further processing prior to transmission, wherein successive pairs of modulation symbols are generated from corresponding successive pairs of bits, the further processing is performed concurrently on each pair of modulation symbols, and the further processing comprises processing the modulation symbols for transmission using a multiple access transmission scheme.

2. The method of claim 1, wherein successive pairs of bits are alternatingly converted to modulation symbols using alternatingly different symbol constellations.

3. The method of claim 2, wherein the different symbol constellations comprise a first symbol constellation consisting of points $\{re^{j\theta}, re^{j(\theta+\pi)}\}$ and a second symbol constellation consisting of points $\{re^{j(\theta+\pi/2)}, re^{j(\theta-\pi/2)}\}$, wherein r is a predetermined magnitude value and θ is a predetermined phase offset value.

4. The method of claim 1, wherein the further processing comprises Single Carrier Frequency Division Multiple Access (SC-FDMA) processing of symbols for transmission.

5. The method of claim 1, wherein the further processing comprises Orthogonal Frequency Division Multiple Access (OFDMA) processing of symbols for transmission.

6. The method of claim 1, wherein the further processing comprises sub-Physical Resource Block (sub-PRB) modulation.

7. The method of claim 1, wherein the further processing comprises handling the pairs of modulation symbols as modulation symbols mapped to a pair of respective tones to be transmitted using a corresponding pair of subcarriers of a Physical Resource Block comprising the pair of subcarriers along with additional subcarriers.

8. The method of claim 1, further comprising performing a Discrete Fourier Transform (DFT) operation on each successive pair of modulation symbols, the DFT operation following or integrated with the converting of pairs of bits into corresponding pairs of modulation symbols.

9. The method of claim 8, wherein the DFT operation is performed as part of SC-FDMA processing of the pairs of modulation symbols.

10. The method of claim 1, further comprising performing the further processing, wherein the further processing comprises one or more of:
performing a Discrete Fourier Transform (DFT) on each pair of modulation symbols;

mapping of generated pairs of symbols from a DFT operation to a plurality of subcarriers of a Physical Resource Block (PRB);

performing an inverse Discrete Fourier Transform (iDFT) on concurrent sets of symbols;

transmission filtering of concurrent sets of symbols; and wirelessly transmitting symbols representing the binary input data.

11. An apparatus for communicating data, the apparatus comprising electronic circuitry configured to:

receive binary input data;

convert pairs of bits of the binary input data into corresponding pairs of modulation symbols using in-phase pi/2 binary phase-shift keying (BPSK), both bits of each pair of bits being converted to modulation symbols using a same symbol constellation; and provide pairs of modulation symbols for further processing prior to transmission, wherein successive pairs of modulation symbols are generated from corresponding successive pairs of bits, the further processing is performed concurrently on each pair of modulation symbols, and the further processing comprises processing the modulation symbols for transmission using a multiple access transmission scheme.

12. The apparatus of claim 11, wherein the apparatus is configured to convert pairs of bits of the binary input data into corresponding pairs of modulation symbols by: alternatingly converting successive pairs of bits to modulation symbols using alternatingly different symbol constellations.

13. The apparatus of claim 12, wherein the different symbol constellations comprise a first symbol constellation consisting of points $\{re^{i\theta}, re^{i(\theta+\pi)}\}$ and a second symbol constellation consisting of points $\{re^{i(\theta+\pi/2)}, re^{i(\theta-\pi/2)}\}$, wherein r is a predetermined magnitude value and $\theta$ is a predetermined phase offset value.

14. The apparatus of claim 11, wherein the electronic circuitry comprises:

a pair of synchronized pi/2 BPSK bit-to-symbol converters operating in parallel to convert different respective bits of each of the pairs of bits into different respective symbols of each of the pairs of modulation symbols.

15. The apparatus of claim 11, wherein the electronic circuitry comprises:

a pi/2 BPSK bit-to-symbol converter configured to convert each bit of each of the pairs of bits into respective symbols of each of the pairs of modulation symbols.

16. The apparatus of claim 11, wherein the electronic circuitry comprises a splitter circuit configured to assign different respective bits of each of the pairs of bits to different tones prior to bit-to-symbol conversion, or to assign different respective symbols of each of the pairs of modulation symbols to different tones following bit-to-symbol conversion, the tones to be transmitted using a corresponding pair of subcarriers of a Physical Resource Block comprising the pair of subcarriers along with additional sub carriers.

17. The apparatus of claim 11, wherein the electronic circuitry comprises a combination two-tone pi/2 BPSK bit-to-symbol converter and discrete Fourier transform (DFT) converter configured to directly map the pairs of bits to frequency domain representations of the corresponding pairs of modulation symbols in a single operation.

18. The apparatus of claim 11, wherein the further processing comprises Single Carrier Frequency Division Multiple Access (SC-FDMA) processing of symbols for transmission.

19. The apparatus of claim 11, wherein the further processing comprises sub-Physical Resource Block (sub-PRB) modulation.

20. The apparatus of claim 11, wherein the further processing comprises handling the pairs of modulation symbols as modulation symbols mapped to a pair of respective tones to be transmitted using a corresponding pair of subcarriers of a Physical Resource Block comprising the pair of subcarriers along with additional subcarriers.

21. The apparatus of claim 11, wherein the electronic circuitry is further configured to perform a Discrete Fourier Transform (DFT) operation on each successive pair of modulation symbols, the DFT operation following or integrated with the converting of pairs of bits into corresponding pairs of modulation symbols.

22. The apparatus of claim 21, wherein the DFT operation is performed as part of SC-FDMA processing of the pairs of modulation symbols.

23. The apparatus of claim 11, wherein the electronic circuitry is further configured to perform the further processing, wherein the further processing comprises one or more of:

performing a Discrete Fourier Transform (DFT) on each pair of modulation symbols;

mapping of generated pairs of symbols from a DFT operation to a plurality of subcarriers of a Physical Resource Block (PRB);

performing an inverse Discrete Fourier Transform (iDFT) on concurrent sets of symbols;

transmission filtering of concurrent sets of symbols; and wirelessly transmitting symbols representing the binary input data.

* * * * *